(12) United States Patent
Liu (10) Patent No.: US 11,226,652 B2
(45) Date of Patent: Jan. 18, 2022

(54) WEARABLE DEVICE (71) Applicant: GUANGDONG OPPO MOBILE TELECOMMUNICATIONS CORP., LTD., Guangdong (CN)

(72) Inventor: Enfu Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/993,683

(22) Filed: Aug. 14, 2020

(65) Prior Publication Data

US 2021/0048841 A1    Feb. 18, 2021

(30) Foreign Application Priority Data

Aug. 16, 2019  (CN) .......................... 201910756672.8

(51) Int. Cl.
*G06F 1/16* (2006.01)
*G09G 5/02* (2006.01)
(Continued)

(52) U.S. Cl.
CPC ............ *G06F 1/163* (2013.01); *A44C 5/0015* (2013.01); *A44C 5/14* (2013.01); *G04B 37/1486* (2013.01);
(Continued)

(58) Field of Classification Search
CPC combination set(s) only.
See application file for complete search history.

(56) References Cited

U.S. PATENT DOCUMENTS

2016/0088880 A1   3/2016 Tulloch et al.
2016/0363957 A1*  12/2016 Stroetmann ............. G06F 1/189
(Continued)

FOREIGN PATENT DOCUMENTS

CN        204360103 U     5/2015
CN        104834208       8/2015
(Continued)

OTHER PUBLICATIONS

EPO, Extended European Search Report for EP Application No. 20190618.7, dated Jan. 14, 2021.
(Continued)

*Primary Examiner* — Wesner Sajous
(74) *Attorney, Agent, or Firm* — Hodgson Russ LLP (57) ABSTRACT

The disclosure relates to a wearable device, including a body, at least three conductive pins, and a strap. The body defines an accommodation cavity and a mounting slot. The at least three conductive pins are spaced apart from each other, located in the mounting slot and electrically connected to the mainboard. The strap includes a strap body, a locking end connected to the strap body, and a conductive component positioned at the locking end. The locking end is configured to be detachably positioned in the mounting slot. When the locking end is positioned in the mounting slot, the conductive component is electrically connected to at least two of the at least three conductive pins. The body may provide a user with a display interface. The displaying characteristics of the display interface correspond to at least two of the at least three conductive pins that are electrically connected.

20 Claims, 9 Drawing Sheets (51) Int. Cl.
*G09G 5/10* (2006.01)
*H01R 12/70* (2011.01)
*H01R 13/24* (2006.01)
*A44C 5/14* (2006.01)
*A44C 5/00* (2006.01)
*G04B 37/14* (2006.01)
*H01R 12/72* (2011.01)

(52) U.S. Cl.
CPC ............... *G09G 5/02* (2013.01); *G09G 5/10* (2013.01); *H01R 12/7076* (2013.01); *H01R 12/7082* (2013.01); *H01R 12/722* (2013.01); *H01R 13/2471* (2013.01); *G09G 2320/0626* (2013.01); *G09G 2320/0666* (2013.01)

(56) References Cited

U.S. PATENT DOCUMENTS

| | | | |
|---|---|---|---|
| 2017/0027511 A1* | 2/2017 | Connor | A61B 5/0537 |
| 2018/0059714 A1 | 3/2018 | Martin et al. | |
| 2018/0084873 A1 | 3/2018 | Kallman et al. | |
| 2019/0137948 A1* | 5/2019 | Yaghmour | G04G 21/04 |

FOREIGN PATENT DOCUMENTS

| | | |
|---|---|---|
| CN | 104850002 | 8/2015 |
| CN | 205122753 | 3/2016 |
| CN | 205944629 U | 2/2017 |
| CN | 106877082 | 6/2017 |
| EP | 2990888 | 3/2016 |
| EP | 3151370 | 4/2017 |
| EP | 3352043 | 7/2018 |
| WO | WO2018058578 A1 | 4/2018 |
| WO | 2018176662 | 10/2018 |

OTHER PUBLICATIONS

CNIPA, First Office Action for CN Application No. 201910756672.8, dated Jun. 30, 2021.

IPO, Examination Report issued in IN Application No. 202014034899, dated Sep. 15, 2021.

* cited by examiner

WEARABLE DEVICE

CROSS-REFERENCE TO RELATED APPLICATION

This application claims priority to Chinese Patent Application No. 201910756672.8, filed Aug. 16, 2018, the entire disclosure of which is incorporated herein by reference.

TECHNICAL FIELD

The present disclosure relates to the technical field of electrical devices, and more particularly, to a wearable device.

BACKGROUND

Typically, a wearable device includes an electronic device body and a strap coupled to the electronic device body in order to attach the wearable device to a wrist, neck, head or other parts of a user or other object. In some related technologies, the electronic device body can obtain certain information from the strap.

SUMMARY

The disclosure provides a wearable device. The wearable device includes a body, at least three conductive pins, and a strap. The body defines an accommodation cavity and a mounting slot. The body includes a mainboard. The mainboard is accommodated in the accommodation cavity. The at least three conductive pins are spaced apart from each other and accommodated in the mounting slot. The at least three pins are electrically connected to the mainboard. The strap includes a strap body, a locking end, and a conductive component. The locking end is connected to the strap body and configured to be detachably engaged in the mounting slot. The conductive component is positioned at the locking end. When the locking end is engaged in the mounting slot, the conductive component is electrically connected to at least two conductive pins of the at least three conductive pins. The body is configured to provide a user with a display interface and recognize the at least two conductive pins that are electrically connected to the conductive component, and one or more display characteristics of the display interface correspond to the at least two conductive pins electrically connected to the conductive component.

A wearable device include a body, at least three conductive pins, a first strap and a second strap. The body defines an accommodation cavity and a mounting slot. The body includes a mainboard accommodated in the accommodation cavity. The at least three conductive pins are spaced apart from each other and accommodated in the mounting slot. The at least three pins are electrically connected to the mainboard. The first strap includes a first strap body, a first locking end and a first conductive component. The first locking end is connected to the first strap body and configured to be detachably engaged in the mounting slot. The first conductive component is positioned at the first locking end. When the first locking end is engaged in the mounting slot, the first conductive component is electrically connected to a first group of pins of the at least three conductive pins, and the number of the first group of pins is at least two. The second strap includes a second strap body, a second locking end and a second conductive component. The second locking end is connected to the second strap body and configured to be detachably engaged in the mounting slot. The second conductive component is positioned at the second locking end. When the second locking end is engaged in the mounting slot, the second conductive component is electrically connected to a second group of pins of the at least three conductive pins, and the number of the second group of pins is at least two, and the second group of pins are not identical to the first group of pins. The body is configured to provide a user with a display interface and recognize conductive pins that are electrically connected to the first conductive component or the second conductive component, one or more display characteristics of the display interface correspond to at least two conductive pins that are electrically connected to the conductive component when the first locking end or the second locking end is engaged in the mounting slot.

BRIEF DESCRIPTION OF THE DRAWINGS

In order to illustrate the embodiments of the disclosure, the accompanying drawings described in the embodiments will be introduced below. Obviously, the accompanying drawings are some illustrative embodiments of the disclosure, so other drawings can be obtained from the accompanying drawings introduced below by those skilled in the art without making any creative efforts.

DETAILED DESCRIPTION

In order to comprehend the disclosure easily, the disclosure will be described with reference to the accompanying drawings. However, the disclosure can be implemented in many different forms and not limited to the embodiments mentioned in the context.

In an embodiment, the strap includes an insulating component. The insulating component is positioned at the locking end. When the locking end is engaged in the mounting slot, except the at least two conductive pins electrically connected to the conductive component, the rest of the at least three conductive pins are insulated from the conductive component by the insulating component.

In an embodiment, the conductive component includes a conductive sheet attached to the locking end. The insulating component includes one or more insulating sheets attached to the conductive sheet.

In an embodiment, the one or more insulating sheets are spaced apart from each other and each of the one or more insulating sheets is configured to insulate the conductive component from one of the at least three pins.

In an embodiment, the mounting slot is defined by a bottom and a sidewall surrounding the bottom, a plurality of through holes are defined in the bottom and communicate with the accommodation cavity. Each of the at least three pins passes through one of the plurality of through holes correspondingly.

In an embodiment, the wearable device further includes a plurality of elastic components positioned in the accommodation cavity. Each of the at least three conductive pins is electrically connected to the mainboard by one of the plurality of elastic components.

In an embodiment, each of the at least three conductive pins includes a bracket, an elastic piece, and a conductive end. The bracket is positioned in one of the plurality of the through holes and electrically connected to the elastic component. The conductive end is connected to the bracket one of the plurality of elastic components. When the locking end is engaged in the mounting slot, the conductive component contacts and squeezes the conductive end so that the elastic piece accumulates elastic potential energy.

In an embodiment, each of the plurality of through holes is defined by a cylindrical surface, one of the cylindrical surface and the bracket defines a positioning slot, the other of the cylindrical surface and the bracket forms a positioning protuberance, and the positioning protuberance is embedded in the positioning slot.

In an embodiment, the number of the at least three conductive pins is four.

In an embodiment, the number of the at least two conductive pins is two.

In an embodiment, the body is configured to recognize the at least two conductive pins by recognizing a resistance value between the two conductive pins electrically connected to the conductive component, the one or more display characteristics of the display interface correspond to the resistance value.

In an embodiment, the bottom defines a first locking hole. The first locking hole is spaced apart from each of the plurality of through holes. The locking end includes a first locking component. The first locking component is configured to be detachably positioned in the first locking hole.

In an embodiment, the bottom defines a second locking hole, the second locking hole is spaced apart from each of the plurality of through holes, the first locking hole and the second locking hole are located along a width direction of the body, the locking end includes a second locking component, and the second locking component is configured to be detachably positioned in the second locking hole.

In an embodiment, a first protrusion and a second protrusion are formed in the bottom, the mounting slot is divided into a first slot, a second slot and a third slot by the first protrusion and the second protrusion, wherein the first slot and the second slot are spaced apart from each other by the first protrusion, the second slot and the third slot are spaced apart from each other by second protrusion, the first slot, the second slot and the third slot are located along the width direction of the strap respectively, wherein the plurality of through holes are defined in the second slot, the first locking hole is defined in the first slot, the second locking hole is defined in the third slot.

In the embodiments mentioned above, the locking end is configured to be detachably engaged in the mounting slot so that the at least three conductive pins hide in or expose out of the mounting slot, when the at least three conductive pins expose out of the mounting slot, the at least three conductive pins are configured as charging interface so that the wearable device is capable of being charged.

In the embodiments mentioned above, the locking end is configured to be detachably engaged in the mounting slot so that the at least three conductive pins hide in or expose out of the mounting slot, when the at least three conductive pins expose out of the mounting slot, the at least three conductive pins are configured to communicate with a peripheral device so that the data transmission between the wearable device and the peripheral device is realizable.

In an embodiment, the conductive component defines one or more receiving grooves, when the locking end is engaged in the mounting slot, except the at least two conductive pins electrically connected to the conductive component, the rest of the at least three conductive pins are receiving in the one or more receiving grooves and not contacting the conductive component, so that the rest of the at least three conductive pins are insulated from the conductive component.

In an embodiment, the conductive component includes an electric wire configured to electrically connect at least two of the at least three conductive pins.

In an embodiment, the one or more display characteristics of the display interface includes at least one of a background color of the display interface, a brightness of the display interface and a background picture.

In an embodiment, the at least two pins electrically connected to the conductive component correspond to a texture of the strap or a color of the strap.

In an embodiment of the disclosure, after the locking end of the strap is engaged in the mounting slot, at least two of the at least three conductive pins of the wearable device get be electrically connected to the conductive component of the strap, and then the mainboard receives a feedback signal resulting from the at least two conductive pins' being electrically connected to the conductive component. Based on the feedback signal, the body can recognize the distinction of the strap and adjust the display interface, for example, adjust the background color of the display interface to match up with the pattern of the strap, or adjust the color of the background of the display interface to be the same as that of the strap. After the strap is engaged in the mounting slot, the strap can be recognized by the body of the wearable, which simplifies the progress that the body matches up with the strap.

Figure 1:
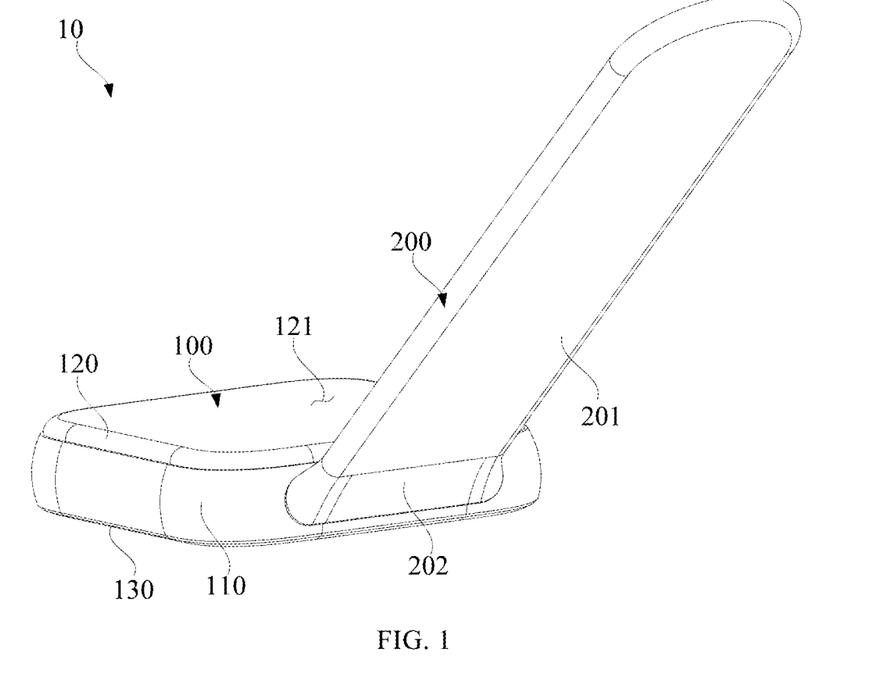
FIG. 1 illustrates a structural schematic view of a wearable device according to an embodiment of the disclosure.

As shown in FIG. 1, the disclosure takes a smart watch as an example to explain a wearable device 10. In an embodiment, the wearable device may include a body 100 and a strap 200 coupled to the body 100. The strap 200 is configured to attach the body 100 to a user, for example, the strap 200 is configured to attach the body 100 to a user's wrist so that the user can wear the wearable device 10. It is understandable to those skilled in the art that the application fields of the disclosure are not limited to the smart watches, any other wearable devices such as a smart bracelet, a smart armlet, etc. can implement the technical solutions described in the application.

Figure 7:
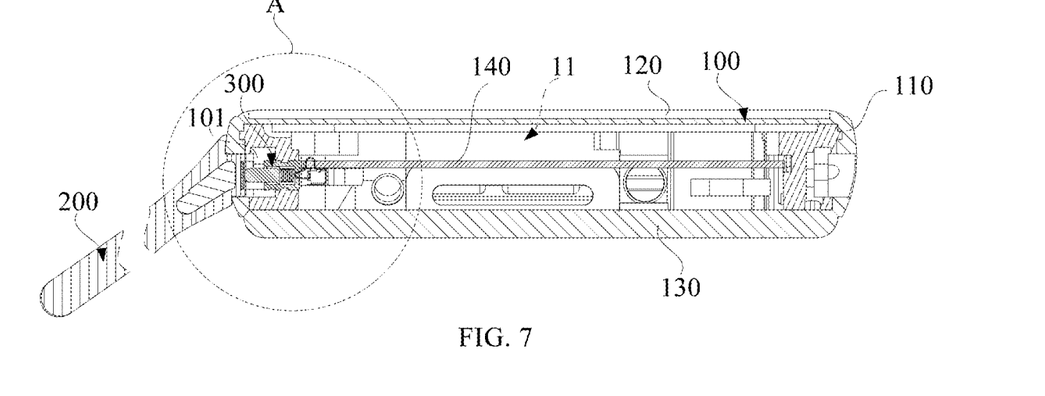
FIG. 7 illustrates a sectional view along the line II-II shown in FIG. 6.

In an embodiment, the body 100 includes a middle frame 110, a display 120 and a rear cover 130. The display 120 and the rear cover 130 are coupled to two opposite sides of the middle frame 110, respectively. The middle frame 110, the display 120 and the rear cover 130 cooperatively define an accommodation cavity for receiving electronic components therein, as shown in FIG. 7.

In an embodiment, as shown in FIG. 1, two opposite ends of a strap 200 can be connected to two opposite sides of a body 100, for example, the two opposite ends of the strap 200 may be connected to two opposite sides of a middle frame 110 of the body 100, and then an annular structure is defined by the strap 200 and the body 100. For example, one end of the strap 200 is fixed to the body 100, the other end of the strap 200 is detachably connected to the body 100, that is, a strap is designed to be an integral band, and the strap 200 is long enough to attach the body 100 to a user's wrist.

Figure 2:
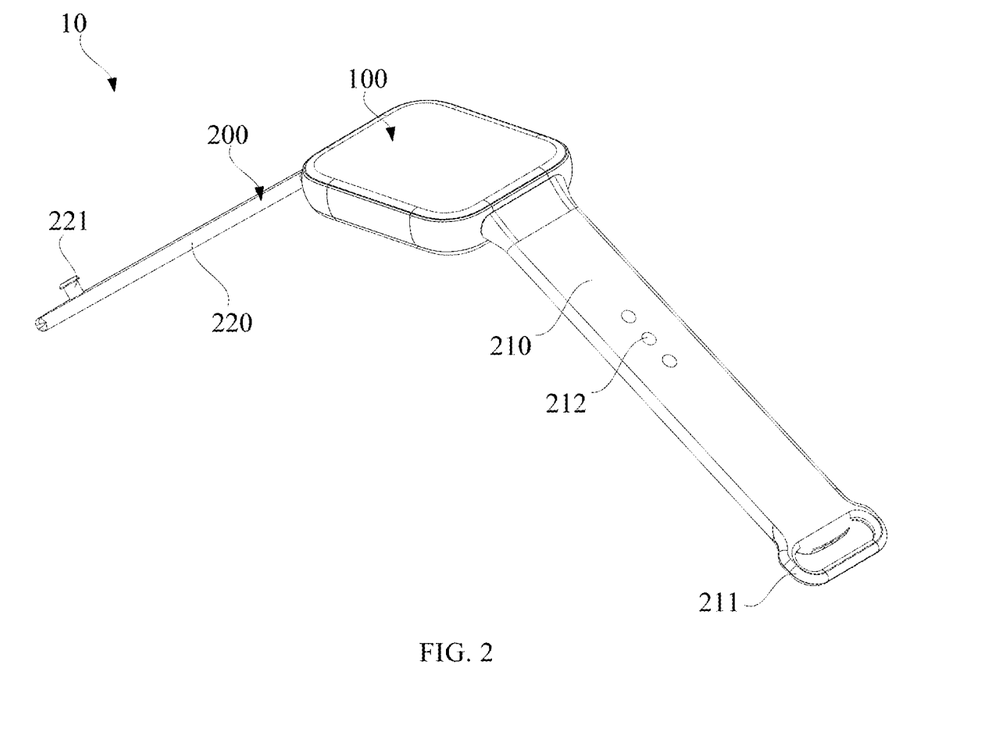
FIG. 2 illustrates a structural schematic view of a wearable device according to another embodiment of the disclosure.

In another embodiment, as shown in FIG. 2, the strap 200 includes a first band 210 and a second band 220. The first band 210 and the second band 220 are connected to two opposite sides of the body 100, respectively. An end that is away from the body 100 of the first band 210 is detachably connected to an end that is away from the body 100 of the second band 220. Thus, after the first band 210 is connected to the second band 220, an annular structure can be defined by the body 100, the first band 210 and the second band 220, when the body 100 is attached to a user's wrist.

In an embodiment, a locking ring 211 is positioned at an end that is away from the body 100 of the first band 210, an end that is away from the body 100 of the second band 220 may be fastened to the first band 210 by passing through the locking ring 211. In an embodiment, a clamping groove 212 is defined in the first band 210 and located between the body 100 and the locking ring 211. A locking protrusion 221 is formed on an end that is away from the body 100 of the second band 220. The end with the locking protrusion 221 can pass through the locking ring 211, so that the locking protrusion 221 can be engaged in one of the clamping grooves and the first band 210 and the second band 220 can be locked by each other.

It is noted that, a plurality of clamping grooves 212 may be defined in the first band 210. For example, if the plurality of clamping grooves are defined on the first band 210 and located along a longitudinal direction of the first band 210, based on the thickness of the users' wrist, the user may adjust a length that the second band 220 passes through the locking ring 211 to lock the locking protrusion 221 into the most appropriate clamping groove 212, and thus the user's wearing comfort can be guaranteed.

In some other embodiments, besides the locking connection between the locking protrusion 221 and the clamping groove 212, after an end of the second band 220 passes through the locking ring 211, the second band 220 may be magnetically fastened to the first band 210. For example, at least one first magnetic component is positioned in the first band 210 and at least one second magnetic component is positioned in the second band 220. Both of the at least one first magnetic component and the at least one second magnetic component are electromagnets or permanent magnets. The second band 220 may be fastened to the first band 210 via the magnetic attraction between the first magnetic component and the second magnetic component. In an embodiment, the at least one first magnetic component is positioned in the first band 210 along a longitudinal direction of the first band 210. It is noted that the at least one first magnetic component or at least one second magnetic component may be replaced by at least one metal piece.

Figure 3:
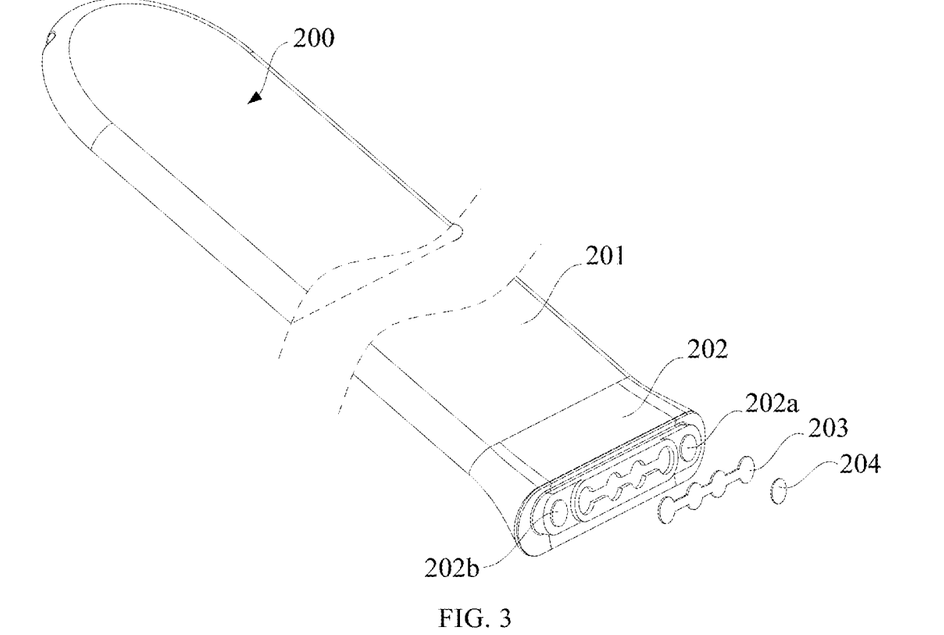
FIG. 3 illustrates a structural schematic view of the strap of the wearable device shown in FIG. 1.
Figure 4:
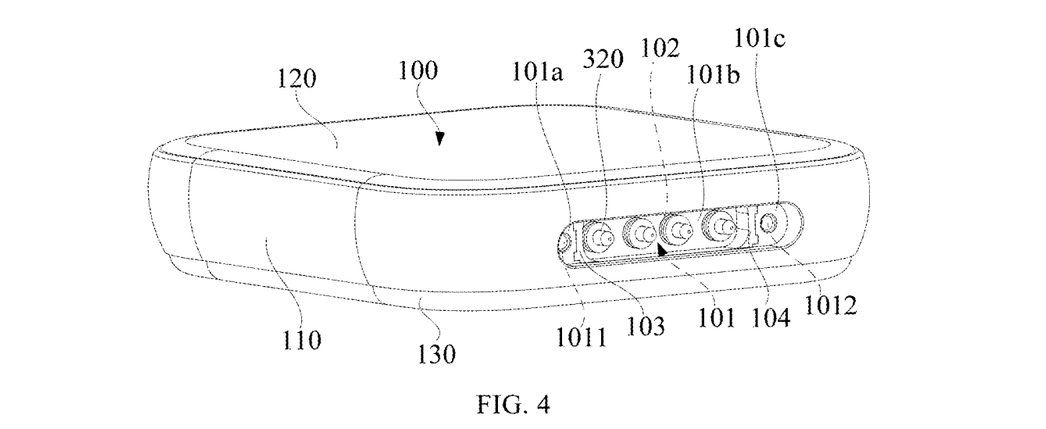
FIG. 4 illustrates a structural schematic view of the body of the wearable device shown in FIG. 1.

In an embodiment, as shown in FIGS. 3 and 4, a strap 200 designed to be an integral band is taken as an example. The middle frame 110 defines a mounting slot 101. The strap 200 includes a strap body 201 and a locking end 202 connected to the strap body 201. The locking end 202 is configured to be detachably engaged in the mounting slot 101. In an embodiment, the mounting slot 101 is defined by a bottom and a sidewall extending from the bottom, a first locking hole 1011 is defined in the bottom of the mounting slot 101. The locking end 202 includes a first locking component 202a. The first locking component 202a is configured to be detachably positioned in the first locking hole 1011 along a longitudinal direction of the strap 200. In an embodiment, a second locking hole 1012 is defined in the bottom of the mounting slot 101. The locking end 202 includes a second locking component 202b. The second locking component 202b is configured to be detachably positioned in the second locking hole 1012 along a longitudinal direction of the strap 200. The first locking hole 1011 and the second locking hole 1012 are located along a width direction of the strap 200. The first locking component 202a and the second locking component 202b are spaced apart from each other and located along the width direction of the strap 200. When the locking end 202 is engaged in the locking slot 101, the locking end 202 may be a spring bar with studs or other kinds of locking components which is not limited in the disclosure. It is noted that, the fixed connection mode mentioned above between the strap 200 and the body 100 may also be applied to the first band 210 and the second band 220, and no repeated description will be provided herein.

Figure 5:
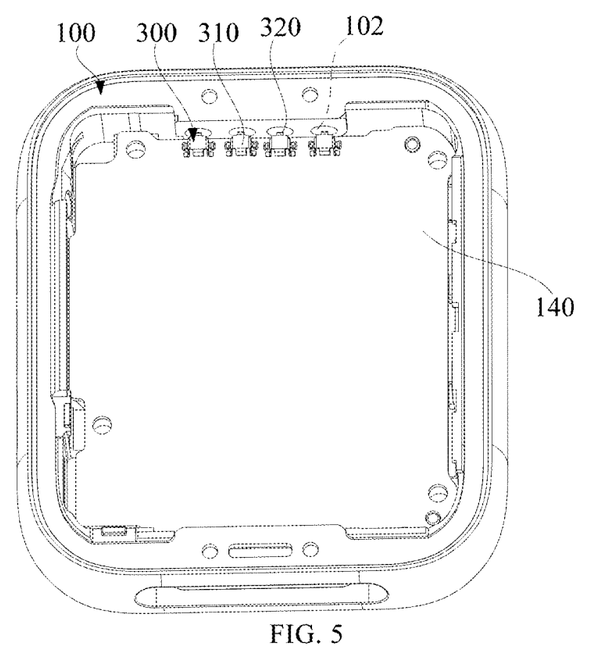
FIG. 5 illustrates an interior structural schematic view of the body shown in FIG. 4.
Figure 6:
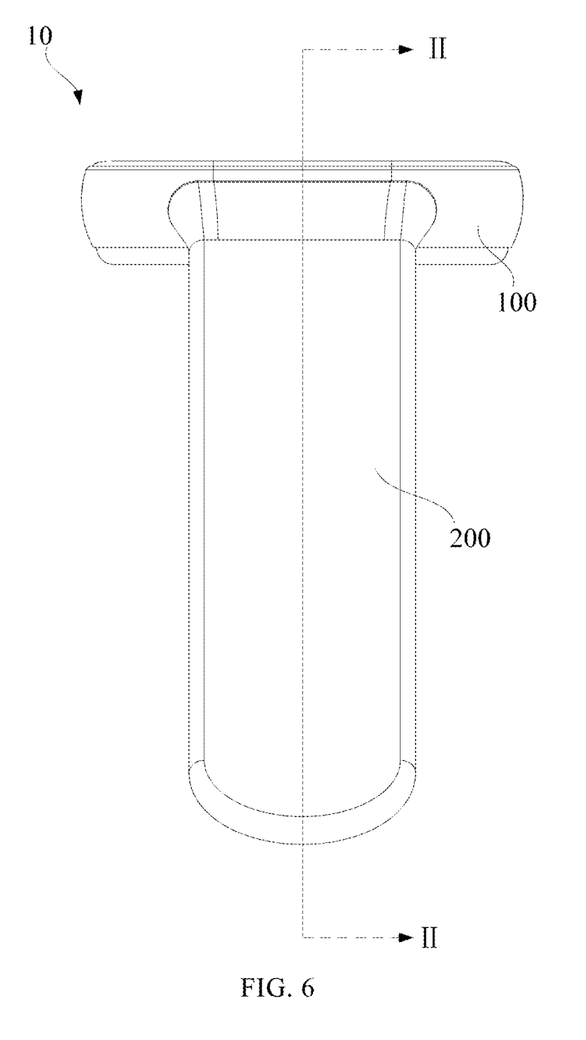
FIG. 6 illustrates a structural schematic view from another perspective of the wearable device shown in FIG. 1.
Figure 8:
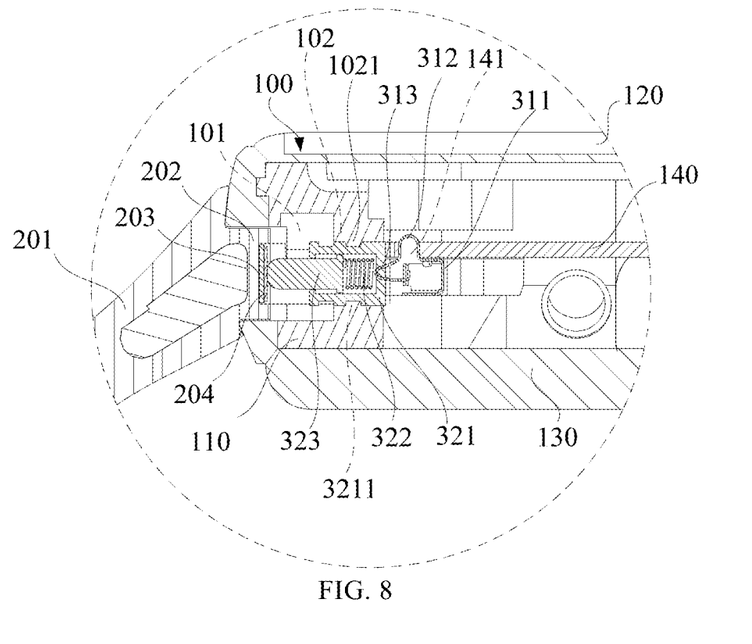
FIG. 8 illustrates an enlarged view of the portion A in FIG. 7.

In an embodiment, as shown in FIGS. 5, 7 and 8, the body 100 includes a mainboard 140 accommodated in the accommodation cavity 11. The wearable device 10 includes a connection assembly 300 that is electrically connected to the mainboard 140. In an embodiment, the connection assembly 300 includes a plurality of elastic components 310 and a plurality of conductive pins 320.

The plurality of elastic components 310 are positioned in the accommodation cavity 11 and electrically connected to the mainboard 140. In an embodiment, as shown in FIG. 8, a plurality of locking openings 141 are defined on the mainboard 140. Each of the elastic components 310 includes an attaching portion 311, a clamping portion 312, and a squeezing portion 313. The attaching portion 311, the clamping portion 312 and the squeezing portion 313 are sequentially connected. The attaching portion 311 is attached to the mainboard 140. The clamping portion 312 is inserted into one of the plurality of locking openings 141. The conductive pins 320 are accommodated in the mounting slot 101. Each of the conductive pins 320 abuts against the squeezing portion 313 and can be squeezed by the squeezing portion 313, so that the conductive pins 320 can be electrically connected to the mainboard 140. When the locking end 202 is engaged in the mounting slot 101, the squeezing portion 313 accumulates elastic potential energy, the contact reliability of the conductive pins 320 and the elastic component 310 can be improved, and then the disconnection between the conductive pins 320 and the elastic component 310 may be avoided. It is understandable that, in some other embodiments, the conductive pins 320 may be directly and electrically connected to the mainboard 140. Of course, each of the conductive pins 320 may be electrically connected to the mainboard 140 by a flexible printed circuit board accommodated in the accommodation cavity 11.

In an embodiment, as shown in FIG. 3 and FIG. 4, the number of the conductive pins is at least three. The conductive pins are positioned in the mounting slot 101. The strap 200 further includes a conductive component 203 positioned at the locking end 202. The conductive component may be a conductive sheet, such as a metal sheet. When the locking end 202 is engaged in the mounting slot 101, the conductive component can be electrically connected to at least two conductive pins 320. The body may recognize the strap by recognizing the conductive pins that are electrically connected to the conductive component. The body 100 can provide a user with a display interface. The display interface may be provided by a display 120. One or more characteristics of the display interface correspond to the conductive pins 320 which are electrically connected to the conductive component, that is, one or more characteristics of the display interface may change due to the change of the conductive pins 320 which are electrically connected to the conductive component 203. The characteristics of the display interface may be a background color of the interface, brightness of interface, etc.

For example, there is an scenario in which, the color of the appearance of the strap 200 is green, when the strap 200 is positioned in the body 100, the conductive component 203 positioned in the predetermined position of the locking end 202 can be electrically connected to two conductive pins 320. The mainboard 140 includes a processor in which a program is stored and the program corresponds to two conductive pins 320 that are electrically connected, when the two conductive pins 320 that are electrically connected by the conductive component 203 are recognized, the program is triggered to execute, and then a user display interface corresponding to the strap 200 will be provided, for example, the background color of the display interface turns to be green, i.e., the same color as the strap 200. If the two conductive pins that are electrically connected are not recognized to be the predetermined two conductive pins, the background color of the display interface may be other color than green. It is noted that, the green color is just for the purpose of taking an example and cannot be considered as a limitation of the technical solutions of the embodiments. The color of the appearance of the strap 200 may be pure color or compound colors.

For another example, if the color of the appearance of the strap 200 is light-colored, when the strap 200 is connected to the body 100, the conductive component 203 positioned in a predetermined position on the locking end 202 can be electrically connected to two conductive pins 320. The mainboard 140 includes a processor in which a program is stored and the program corresponds to two conductive pins 320 that are electrically connected. When the two conductive pins 320 which are electrically connected to each other are recognized, the program is triggered to execute, and then a user display interface corresponding to the strap 200 will be provided, for example, the background color of the display interface turns to be green, i.e., the same color as the strap 200, and then a user display interface corresponding to the strap 200 will be provided, for example, the background brightness of the display interface changes to match with the light-colored strap 200.

With respect of the wearable device 10 mentioned in the disclosure, when the locking end 202 is positioned in the mounting slot 101, the conductive component is connected to at least two of the conductive pins 320. When the at least two conductive pins 320 is electronically connected by the conductive component, the mainboard 140 may receive a feedback signal caused by the fact that the at least two conductive pins 320 is electronically connected and then recognize the types of the strap 200, such as the texture of the strap 200, the color of strap 200. Based on the recognized type of the strap 200, the body 100 may adjust the displaying interface, for example, adjust the background picture of the displaying interface to match with the texture of the strap 200, or adjust the background color of the displaying interface to match with the color of the strap 200. The type of the strap 200 can be recognized after the locking end 202 is positioned in the mounting slot 101, which simplifies the progress that the display interface matches with the strap 200.

In an embodiment, the strap 200 may further include an one or more insulating components when the locking end 202 is positioned in the mounting slot 101, except the conductive pins that are electrically connected, the rest of the conductive pins are connected to the one or more insulating component 204 so that the rest of the conductive pins are insulated from the conductive component 203, i.e., the rest of the conductive pins are prevented from being interfered by the conductive pins that are electrically connected, and the matching performance of the display interface and the strap 200 may also be prevented from being interfered. The number of the rest of the conductive pins is at least one.

In an embodiment, the conductive component 203 may include a component sheet, and the insulating component 204 may include one or more insulating sheets attached to the conductive component. It is noted that, the one or more insulating sheets may be one or more insulating films formed on a surface of the conductive sheet, or one or more insulating boards fastened to a surface of the conductive sheet. The one or more insulating sheets and the conductive component may be manufactured to be a whole board, and the materials of the one or more insulating sheets and the conductive component are different, that is, the whole board include a conductive portion and one or more insulating portions. Of course, the conductive component 203 may be an electric wire that can be electrically connected to at least two conductive pins. Any conductive component that can be electrically connected to at least two conductive pins will fall in the protection scope of the embodiment.

In an embodiment, as shown in FIG. 4 and FIG. 5, a plurality of through holes 102 are defined in the bottom of the mounting slot 101 and communicating with the accommodation cavity 11. Each of the through holes 102 is spaced apart from each of the first slot 1011 and the second slot 1012. Each of the conductive pins 320 passes through one of the plurality of through holes 102. Each of the conductive pins 320 includes a bracket 321, an elastic piece 322 and a conductive end 323. The conductive end 323 is connected to the bracket 321 by the elastic piece 322. The elastic piece 322 may be a spring. When the locking end 202 is positioned in the mounting slot 101, the conductive end 323 will be squeezed by the conductive component 203 and trigger the elastic piece 322 to accumulate elastic potential energy. When the locking end 202 is removed from the mounting slot 101, the elastic piece 322 will release the elastic potential energy and then the conductive end 323 returns to an initial position. It is understandable that, in some other embodiments, each of the conductive pins may be a pogo pin, such as a metal pogo pin.

In an embodiment, as shown in FIG. 8, each of the plurality of through holes is defined by a cylindrical surface, a positioning protuberance 1021 is defined on the cylindrical surface, and a positioning slot 3211 is defined on a surface of the bracket 321, and the positioning protuberance 1021 is clamping into the positioning slot 3211. It is understandable that, in some other embodiments, the positioning protuberance 1021 may be formed on a surface of the bracket 321 and the positioning slot 3211 may be defined on the cylindrical surface, and thus the stability of the conductive pin passing through the through hole can be improved. In order to facilitate the assembly of the conductive pin 320 and improve the reliability after assembly, the conductive pin 320 can be positioned in the through hole 102 by injecting molding process.

In an embodiment, as shown in FIG. 4, the bottom of the mounting slot 101 forms a first protrusion 103 and a second protrusion 104. The mounting slot 101 has a width fitting for a depth of the strap 200, and a length fitting for a width of the strap 200. The mounting slot 101 is divided into a first slot 101a, a second slot 101b and a third slot 101c by the first protrusion 103 and the second protrusion 104 along the length direction of the mounting slot 101. The first slot 101a, the second slot 101b and the third slot 101c are substantially aligned with each other. The through hole 102 is defined in the second slot 101b. The first locking hole 1011 is defined in the first slot 101a. The second locking hole 1012 is defined in the third slot 101c. When the locking end 202 is positioned in the mounting slot 101, it is convenient for the first locking component 202a to be positioned in the first slot 101a, and for the second locking component 202b to be positioned in the second slot 101b. The interference with the conductive pins may be avoided, and the locking end 202 can be easily positioned in the mounting slot 101.

In an embodiment, the connection assembly 300 is configured to be electrically connected to a peripheral device, so that the data transmission between the wearable device and the peripheral device is realizable or a battery of the body 100 is capable of being charged. It is noted that, the connection assembly 300 may be configured to be electrically connected to a peripheral device, so that the data transmission between the wearable device and the peripheral device is realizable and a battery of the body 100 is capable of being simultaneously charged. It is understandable that, in some other embodiments, the connection assembly 300 may only be configured as an intermediate supplementary element to recognize the type of the strap 20 and not configured as a charging interface or data-transmitting interface.

The locking end 202 is configured to be detachably positioned in the mounting slot 101. When the strap 200 is connected to the body 100 and the wearable device is not transmitting data or charged, the conductive pins 320 are hidden in the mounting slot 101. When the wearable device needs to be transmitting data or charged, the conductive pins are exposed out of the mounting slot 101, and the conductive pins are configured as charging interface to charge the wearable device or configured to be connected with the peripheral device to realize the data transmission between the mainboard 140 and the peripheral device.

It is noted that, two mounting slots 101 may be defined on two opposite sides of the body 100. The conductive pins are positioned in the two mounting slots. Taking the example that the strap 200 includes a first band 210 and a second band 20 as an example, a portion of the first band 210 (may be understood as the same structure as the locking end 202) and a portion of the second band 220 (may be understood as the same structure as the locking end 202) are detachably positioned in the two mounting slots, and then realize the hide or exposure of the conductive pins. In an embodiment, some conductive pins positioned in one of the two opposite sides of the body 100 are configured to transmit data, and others positioned in the other of the two opposite sides of the body 100 are configured to charge a battery.

With respect of an wearable device 10 mentioned above, the locking end 202 is detachably positioned in the mounting slot 101, and the conductive pins may be hidden in the mounting slot 101 or exposed out of the mounting slot, so that the conductive pins 320 can be electrically connected to a peripheral device and some functions such as charging and data transmission may be realized. In addition, compared to a conductive pin electrically connected to the mainboard by a flexible printed circuit, a conductive pin 320 electrically connected to the mainboard by an elastic component 310 may reduce the size of the accommodation cavity and simplify the assembly process of the conductive pins 320 and the elastic components 310.

Figure 9:
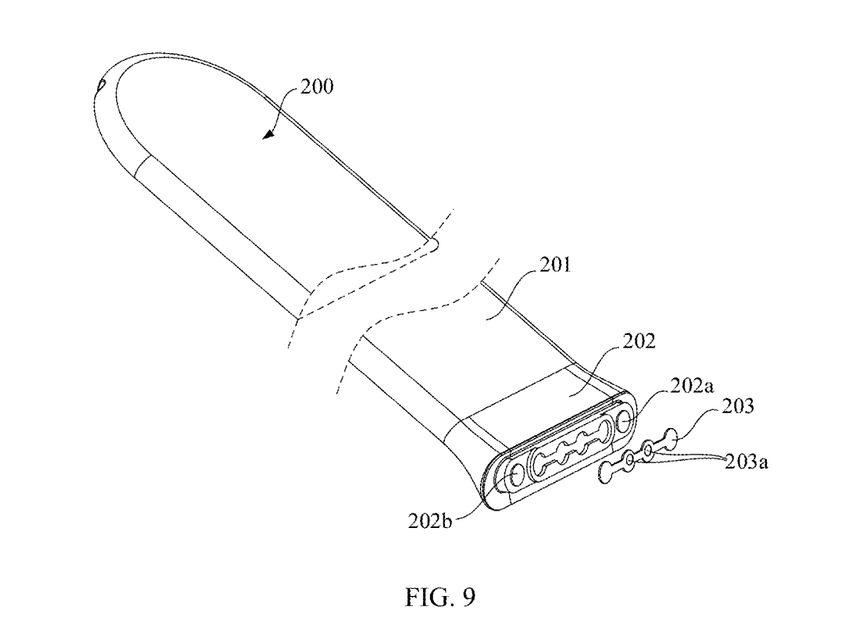
FIG. 9 illustrates a structural schematic view of the strap according to an embodiment of the disclosure.

In an embodiment, as shown in FIG. 4 and FIG. 9, the conductive component 203 defines one or more receiving grooves 203a, when the locking end 202 is engaged in the mounting slot 101, except the at least two conductive pins electrically connected to the conductive component 203, the rest of the at least three conductive pins 320 are receiving in the one or more receiving grooves 203a and not contacting the conductive component 203, so that the rest of the at least three conductive pins are insulated from the conductive component 203.

Figure 10:
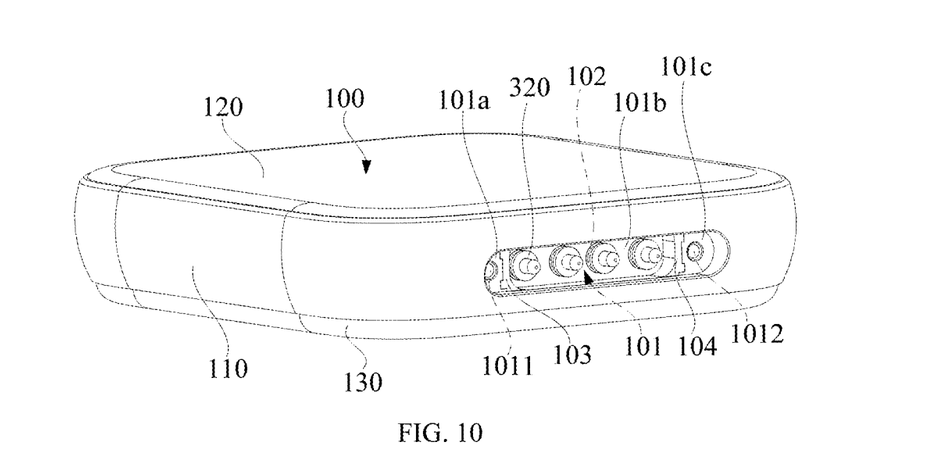
FIG. 10 illustrates a structural schematic view of the body of the wearable device according to another embodiment.
Figure 11:
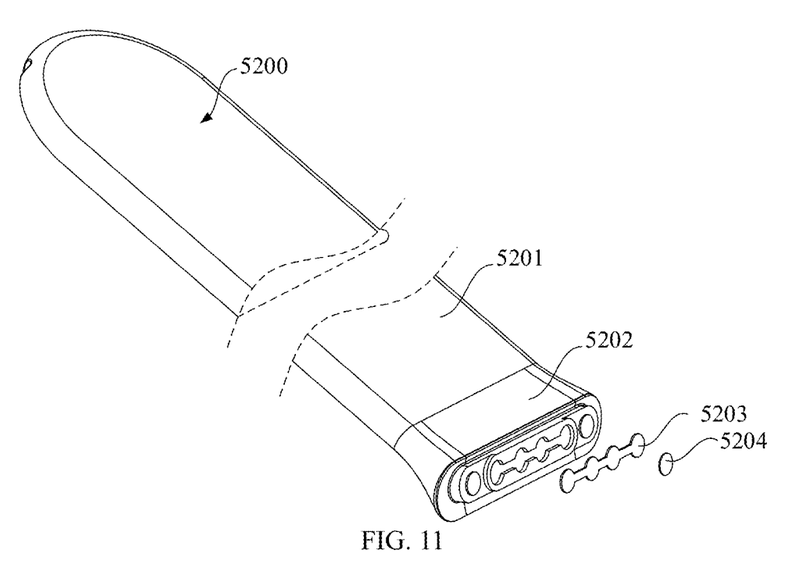
FIG. 11 illustrates a structural schematic view of a first strap that can be coupled to the body shown in FIG. 10.
Figure 12:
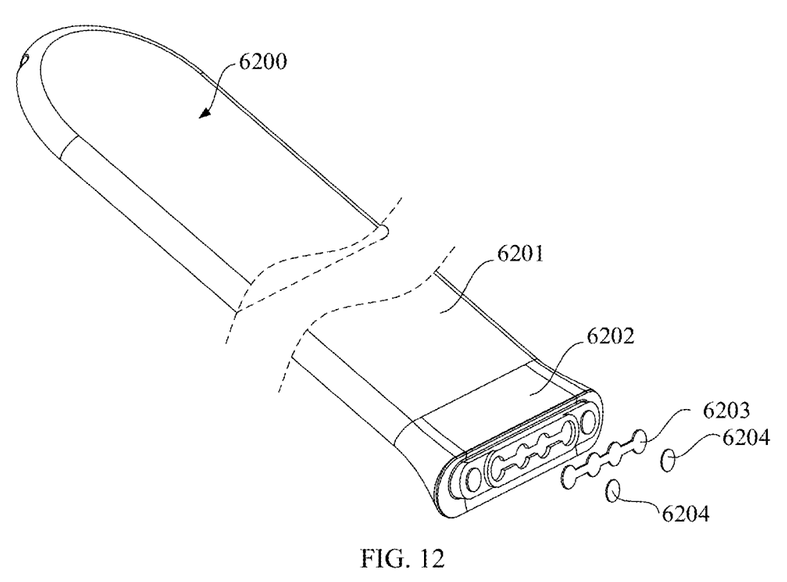
FIG. 12 illustrates a structural schematic view of a second strap that can be coupled to the body shown in FIG. 10.

In an embodiment, the wearable device includes a body, at least three conductive pins, a first strap and a second strap. The body defines an accommodation cavity and a mounting slot. The body includes a mainboard accommodated in the accommodation cavity. As shown in FIGS. 10-12, the number of the at least three conductive pins 320 may be four in the embodiment. The conductive pins 320 are spaced apart from each other and accommodated in the mounting slot. The conductive pins 320 are electrically connected to the mainboard 140. The first strap 5200 includes a first strap body 5201, a first locking end 5202 and a first conductive component 5203. The first locking end 5202 is connected to the first strap body 5201. The first locking end 5202 is configured to be detachably engaged in the mounting slot 101. The first conductive component 5203 is positioned at the first locking end 5202. When the first locking end 5202 is engaged in the mounting slot 101, the first conductive component 5203 is electrically connected to a first group of pins of the at least three pins. The number of the first group of pins is at least two. The second strap 6200 includes a second strap body 6201, a second locking end 6202 and a second conductive component 6203. The second locking end 6202 is connected to the second strap body 6201. The second locking end 6202 is configured to be detachably engaged in the mounting slot 101. The second conductive component 6203 is positioned at the second locking end 6202. When the second locking end 6202 is engaged in the mounting slot 101, the second conductive component 6203 is electrically connected to a second group of pins of the at least three pins. The number of the second group of pins is at least two. The second group of pins are not identical to the first group pins. In one embodiment, when the first locking end 5202 is engaged in the mounting slot 101, the number of first group of pins may be three, and when the second locking end 6202 is engaged in the mounting slot 101, the number of the second group of pins may be two. In some other embodiments, on the condition that the first group of pins are not identical to the second group of pins, the number of the first group of pins may be equal to the number of the second group of pins, for example, the number is two. The body 100 is configured to provide a user with a display interface and recognize the conductive pins that are electrically connected to the first conductive component 5203 or the second conductive component 6203, one or more display characteristics of the display interface correspond to at least two conductive pins that are electrically connected to the conductive component when the first locking end 5202 or the second locking end 6202 is engaged in the mounting slot 101. The body may recognize the strap by recognizing the conductive pins that are electrically connected to the conductive component. For example, the body may recognizes the conductive pins that are electrically connected to the conductive component by identifying two pins that are compressed when the strap is coupled to the body, or by calculating the resistance value between two of conductive pins when the strap is coupled to the body. The one or more display characteristics of the display interface includes at least one of a background color of the display interface, a brightness of the display interface and a background picture. In the embodiment, since the first group of pins are not identical to the second group of pins, the one or more display characteristics of the display interface may be changed when the first strap 5200 is detached from the body 100 and the second strap 6200 is coupled to the body 100. As shown in FIG. 11, the first strap 5200 includes a first insulating component positioned at the first locking end 5202, when the first locking end 5202 is engaged in the mounting slot 101, except the first group of pins electrically connected to the first conductive component 5203, the rest of the at least three conductive pins 230 are insulated from the first conductive component 5203 by the first insulating component 5204. In the embodiment the first insulating component 5204 includes a first insulating component 5204. As shown in FIG. 12, the second strap 6200 includes a second insulating component. The second insulating component includes two second insulating sheets 6204 positioned at the second locking end 6202, when the second locking end 6202 is engaged in the mounting slot 101, except the second group of pins electrically connected to the second conductive component 6203, the another rest of the at least three conductive pins are insulated from the second conductive component 6203 by the second insulating component; wherein the first insulating component and the second insulating component are configured as different so that the first group of pins are not identical to the second group of pins.

Figure 13:
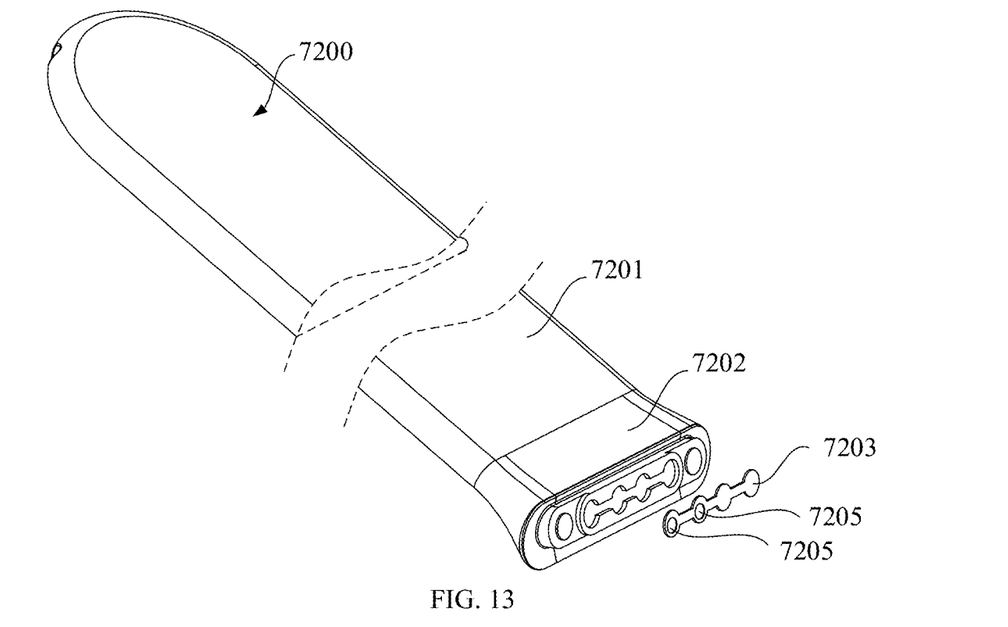
FIG. 13 illustrates a structural schematic view of another first strap that can be coupled to the body shown in FIG. 10.
Figure 14:
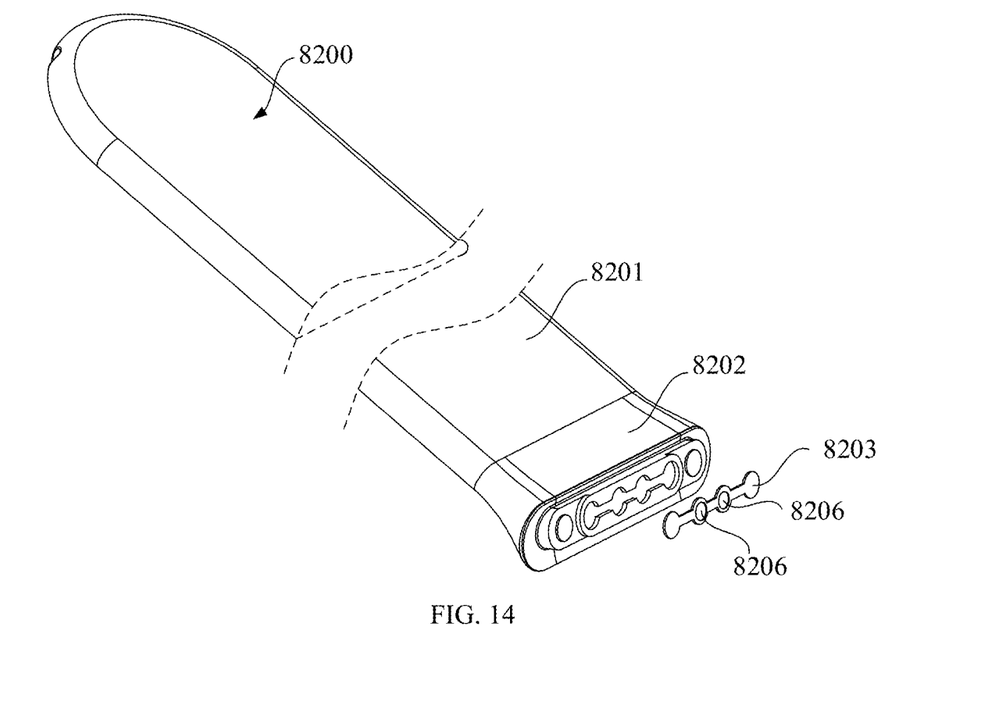
FIG. 14 illustrates a structural schematic view of another second strap that can be coupled to the body shown in FIG. 10.

FIG. 13 illustrates a first strap 7200 includes a first strap body 7201, a first locking end 7202 and a first conductive component 7203. The first locking end 7202 is connected to the first strap body 7201. The first locking end 7202 is configured to be detachably engaged in the mounting slot 101. The first conductive component 7203 is positioned at the first locking end 7202. When the first locking end 7202 is engaged in the mounting slot 101, the first conductive component 7203 is electrically connected to a first group of pins of the at least three pins. The number of the first group of pins is at least two. The first conductive component 7203 defines a first group of grooves 7205, the number of the first group of grooves 7205 is at least one, when the first locking end is engaged in the mounting slot 101, except the first group of pins electrically connected to the first conductive component 7203, the rest of the at least three conductive pins are receiving in the first group of grooves 7205 and not contacting the first conductive component 7203, so that the rest of the at least three conductive pins are insulated from the first conductive component 7203. FIG. 14 illustrates a second strap 8200 includes a second strap body 8201, a second locking end 8202 and a second conductive component 8203. The second locking end 8202 is connected to the second strap body 8201. The second locking end 8202 is configured to be detachably engaged in the mounting slot 101. The second conductive component 8203 is positioned at the second locking end 8202. When the second locking end 8202 is engaged in the mounting slot 101, the second conductive component 8203 is electrically connected to a second group of pins of the at least three pins. The number of the second group of pins is at least two. The second conductive component 8203 defines a second group of grooves 8206, the number of the second group of grooves 8205 is at least one, when the second locking end is engaged in the mounting slot 101, except the first group of pins electrically connected to the second conductive component 8203, the rest of the at least three conductive pins are receiving in the second group of grooves 8206 and not contacting the second conductive component 8203, so that the rest of the at least three conductive pins are insulated from the second conductive component 8203. The first group of grooves and the second group of grooves are configured as different so that the first group of pins are not identical to the second group of pins. For example, the first group of grooves are two grooves spaced from each other, and the group of grooves are two grooves spaced from each other, but the location of the first group of grooves are different from that of the second group of grooves. In some other embodiments, each of the first group of grooves or each of the second group of grooves may be large enough for two or more conductive pins to receive in. The body may recognize the strap by recognizing the conductive pins that are electrically connected to the conductive component. For example, the body may recognizes the conductive pins that are electrically connected to the conductive component by identifying two pins that are compressed when the strap is coupled to the body, or by calculating the resistance value between two of conductive pins when the strap is coupled to the body. In the embodiment, the first group of pins may be two pins, and the second group of pins may be two, but the resistance value between the first group of pins may be smaller than that between the second group of pins, so the first strap 7200 or the second strap 8200 can be recognized by the body 100. The correspondence relationship between the one or more display characteristics of the display interface and the resistance values may be pre-stored in the body 100. Technical elements of the above embodiments may be combined in any possible ways. In order to make the description concise, not all possible combinations of the technical elements are described. As long as there is no contradiction in a combination of the technical elements, the combination should be considered as part of this specification.

The embodiments described above are part of the embodiments of the disclosure, although the embodiments described above are specific and detailed, they should not be considered as the limitations of the disclosure. It is should be pointed out that, those skilled in the art may make some changes and improvements within the conception of the disclosure, and the changes and improvements belong to the protection scope of the disclosure, and hence the protection scope shall be determined by the claims.

The invention claimed is:
1. A wearable device, comprising:
    a body defining an accommodation cavity and a mounting slot, the body comprising a mainboard accommodated in the accommodation cavity;
    at least three conductive pins spaced apart from each other and accommodated in the mounting slot, the at least three conductive pins being electrically connected to the mainboard; and
    a strap comprising:
        a strap body;
        a locking end connected to the strap body and configured to be detachably engaged in the mounting slot; and a conductive component positioned at the locking end, wherein when the locking end is engaged in the mounting slot, the conductive component is electrically connected to at least two conductive pins of the at least three conductive pins;

wherein the body is configured to provide a user with a display interface and recognize the at least two conductive pins that are electrically connected to the conductive component, one or more display characteristics of the display interface change according to which conductive pins are electrically connected to the conductive component.

2. The wearable device according to claim 1, wherein the strap comprises an insulating component positioned at the locking end, the insulating component configured to insulate all of the at least three conductive pins, except for the at least two conductive pins, from the conductive component when the locking end is engaged in the mounting slot.

3. The wearable device according to claim 2, wherein the conductive component comprises a conductive sheet attached to the locking end, the insulating component comprising one or more insulating sheets attached to the conductive sheet.

4. The wearable device according to claim 3, wherein the one or more insulating sheets are spaced apart from each other and each of the one or more insulating sheets is configured to insulate the conductive component from one of the at least three conductive pins.

5. The wearable device according to claim 3, wherein the mounting slot is defined by a bottom and a sidewall extending from the bottom, a plurality of through holes are defined in the bottom and communicate with the accommodation cavity, and each of the at least three conductive pins passes through one of the plurality of through holes correspondingly.

6. The wearable device according to claim 5, further comprising a plurality of elastic components positioned in the accommodation cavity, each of the at least three conductive pins being electrically connected to the mainboard by one of the plurality of elastic components, wherein each of the at least three conductive pins comprises:

a bracket positioned in one of the plurality of through holes and electrically connected to one of the plurality of elastic components;

an elastic piece; and a conductive end connected to the bracket by the elastic piece, wherein when the locking end is engaged in the mounting slot, the conductive component abuts against the conductive end so that the one of the plurality of elastic components accumulates elastic potential energy.

7. The wearable device according to claim 6, wherein each of the plurality of through holes is defined by a cylindrical surface, one of the cylindrical surfaces and the bracket defines a positioning slot, another of the cylindrical surfaces and the bracket forms a positioning protuberance, and the positioning protuberance is embedded in the positioning slot.

8. The wearable device according to claim 1, wherein there are four of the at least three conductive pins.

9. The wearable device according to claim 8, wherein there are two of the at least two conductive pins.

10. The wearable device according to claim 9, wherein the body is configured to recognize the at least two conductive pins by recognizing a resistance value between the two conductive pins electrically connected to the conductive component, the one or more display characteristics of the display interface corresponding to the resistance value.

11. The wearable device according to claim 1, wherein the conductive component defines one or more receiving grooves;

wherein when the locking end is engaged in the mounting slot, all of the at least three conductive pins, except for the at least two conductive pins, are received in the one or more receiving grooves, are not in contact with the conductive component, and are thereby insulated from the conductive component.

12. The wearable device according to claim 1, wherein the conductive component comprises an electric wire configured to electrically connect at least two of the at least three conductive pins.

13. The wearable device according to claim 1, wherein the one or more display characteristics of the display interface comprises at least one of: a background color of the display interface, a brightness of the display interface, and a background picture.

14. The wearable device according to claim 1, wherein the at least two conductive pins electrically connected to the conductive component correspond to a texture of the strap or a color of the strap.

15. A wearable device, comprising:

a body defining an accommodation cavity and a mounting slot, the body comprising a mainboard accommodated in the accommodation cavity;

at least three conductive pins spaced apart from each other and accommodated in the mounting slot, the at least three conductive pins being electrically connected to the mainboard;

a first strap comprising:

a first strap body;

a first locking end connected to the first strap body and configured to be detachably engaged in the mounting slot; and a first conductive component positioned at the first locking end, wherein when the first locking end is engaged in the mounting slot, the first conductive component is electrically connected to a first group of pins of the at least three conductive pins, and there are at least two of the first group of pins; and a second strap comprising:

a second strap body;

a second locking end connected to the second strap body and configured to be detachably engaged in the mounting slot; and a second conductive component positioned at the second locking end, wherein when the second locking end is engaged in the mounting slot, the second conductive component is electrically connected to a second group of pins of the at least three conductive pins, and there are at least two of the second group of pins, and the second group of pins are not identical to the first group of pins;

wherein the body is configured to provide a user with a display interface and recognize conductive pins that are electrically connected to the first conductive component or the second conductive component, one or more display characteristics of the display interface change according to which conductive pins are electrically connected to the first conductive component or the second conductive component when the first locking end or the second locking end is engaged in the mounting slot.

16. The wearable device according to claim 15, wherein the one or more display characteristics of the display interface comprises at least one of: a background color of the display interface, a brightness of the display interface, and a background picture.

17. The wearable device according to claim 15, wherein the first strap comprises a first insulating component positioned at the first locking end, when the first locking end is engaged in the mounting slot, except the first group of pins electrically connected to the conductive component, the rest of the at least three conductive pins are insulated from the first conductive component by the first insulating component;

wherein the second strap comprises a second insulating component positioned at the second locking end, when the second locking end is engaged in the mounting slot, except the second group of pins electrically connected to the second conductive component, the another rest of the at least three conductive pins are insulated from the second conductive component by the second insulating component; and wherein the first insulating component and the second insulating component are configured as different so that the first group of pins are not identical to the second group of pins.

18. The wearable device according to claim 17, wherein the first insulating component comprises one or more insulating sheets spaced apart from each other, the second insulating component comprises one or more insulating sheets spaced apart from each other;

wherein one of the following:
a number of the one or more insulating sheets of the first insulating component differing from a number of the one or more insulating sheets of the second insulating component; and the number of the one or more insulating sheets of the first insulating component is equal to the number of the one or more insulating sheets of the second insulating component, and the one or more insulating sheets of the first insulating component are disposed at different locations than the one or more insulating sheets of the second insulating component.

19. The wearable device according to claim 15, wherein: the first conductive component defines a first group of grooves, there is at least one of the first group of grooves, when the first locking end is engaged in the mounting slot, a remainder of the at least three conductive pins, except the first group of pins electrically connected to the first conductive component, are received in the first group of grooves and not in contact with the first conductive component, such that the remainder of the at least three conductive pins are insulated from the first conductive component;

wherein: the second conductive component defines a second group of grooves, there are at least one of the second group of grooves, when the second locking end is engaged in the mounting slot, a remainder of the at least three conductive pins, except the second group of pins electrically connected to the second conductive component, are received in the second group of grooves and not in contact with the second conductive component, such that the remainder of the at least three conductive pins are insulated from the second conductive component; and wherein the first group of grooves and the second group of grooves differ such that the first group of pins are not identical to the second group of pins.

20. The wearable device according to claim 15, wherein there are three of the first group of pins, and there are two of the second group of pins.

* * * * *